United States Patent
Epelbaum

(10) Patent No.: US 8,219,600 B2
(45) Date of Patent: Jul. 10, 2012

(54) GENERATING AND APPLYING ANALYTIC MEASUREMENTS

(76) Inventor: Michael Epelbaum, Nashville, TN (US)

( * ) Notice: Subject to any disclaimer, the term of this patent is extended or adjusted under 35 U.S.C. 154(b) by 1249 days.

(21) Appl. No.: 11/973,679

(22) Filed: Oct. 10, 2007

(65) Prior Publication Data

US 2008/0086520 A1 Apr. 10, 2008

Related U.S. Application Data

(60) Provisional application No. 60/850,387, filed on Oct. 10, 2006, provisional application No. 60/850,424, filed on Oct. 10, 2006.

(51) Int. Cl.
G06F 15/00 (2006.01)
G06F 7/32 (2006.01)

(52) U.S. Cl. .................................. 708/200; 708/520

(58) Field of Classification Search .................. 708/200, 708/520
See application file for complete search history.

(56) References Cited

U.S. PATENT DOCUMENTS

| | | | |
|---|---|---|---|
| 6,272,462 B1 * | 8/2001 | Nguyen et al. | 704/244 |
| 6,901,285 B2 * | 5/2005 | Schreck | 600/509 |
| 6,920,349 B2 * | 7/2005 | Schreck | 600/512 |

OTHER PUBLICATIONS

Epelbaum, Michael. 2005. "A new theory and a new method for temporal, spatial, and other correlated phenomena." Complexity 11:36-44.

* cited by examiner

Primary Examiner — Chuong D Ngo

(57) ABSTRACT

The disclosed invention provides methods of generating and applying analytic measurements of real phenomena. The analytic measurements are generated by computerized reiterated multivariate analyses of vectors of matrices. The vectors are generated by computerized reiterated varying power transformations of distances or proximities between measurements of distinct real phenomena. The analytic measurements resulting from the computerized reiterated power transformations and the multivariate analyses are applied to real phenomena.

4 Claims, 5 Drawing Sheets

| Selected data on deaths and live births of infants in U.S. states 2000 by race, gender, and state, and by centroids of U.S. states, with data from U.S. CDC (2006) and the U.S. Census (2001) | | | | | | | |
|---|---|---|---|---|---|---|---|
| Columns | | | | | | | |
| 1 | 2 | 3 | 4 | 5 | 6 | 7 | 8 |
| Variables | | | | | | | |
| Case | State Name | Race | Gender | Centroid | | Deaths | Live Births |
| | | | | Latitude (North) | Longitude (West) | | |
| 1 | Alabama | African American | Male | 33.00147 | -86.7662 | 176 | 11,109 |
| 2 | Alaska | African American | Male | 61.28825 | -148.717 | 6 | 261 |
| 3 | Arizona | African American | Male | 33.37351 | -111.829 | 28 | 1,305 |
| ⋮ | ⋮ | ⋮ | | ⋮ | ⋮ | ⋮ | ⋮ |
| 304 | West Virginia | White | Female | 38.7672 | -80.8202 | 76 | 10,526 |
| 305 | Wisconsin | White | Female | 43.72854 | -89.001 | 142 | 30,783 |
| 306 | Wyoming | White | Female | 42.67576 | -107.009 | 20 | 3,209 |

FIGURE 2

| Column 1 | Column 2 | Column 3 | Column 4 | Column 5 |
|---|---|---|---|---|
| Matrix | $\varphi$ or $\theta$ | $\varphi$ or $\theta$ in Matrix B | $\varphi$ or $\theta$ in Matrix C | $w$ in Matrix C |
| IPC' | $\varphi$ | 0.01 | 0.001 | |
| IPC' | $\theta$ | 0.01 | 7 | 0.001 |
| RSIPC' | $\varphi$ | 0.01 | 20 | |
| RSIPC' | $\theta$ | 0.01 | 0.001 | 0.001 |
| HA'' | $\theta$ | 2.1 | 0.001 | 6 |
| EA'' | $\theta$ | 1 | 0.001 | 8 |
| HR'' | $\theta$ | 1 | 0.001 | 6 |
| RGSEA' | $\theta$ | 1 | 7 | 6 |
| S' | $\varphi$ | 0.01 | 0.001 | |
| S' | $\theta$ | 0.1 | 10 | 6 |
| L | $\varphi$ | 0.01 | 0.0001 | |
| L | $\theta$ | 0.1 | 5 | 1 |
| G | $\theta$ | | 2 | 0.001 |
| R | $\theta$ | | 15 | 0.001 |
| HH | $\theta$ | | 20 | 12 |
| $W$ (i.e., Total Weights $w$) in Matrix C | | | | 45 |
| $\Omega$ in Matrix C | | | 15.79 | |

FIGURE 3

GENERATING AND APPLYING ANALYTIC MEASUREMENTS

CROSS-REFERENCE TO RELATED APPLICATIONS

This application claims benefit, under 35 U.S.C. sctn. 119 (e), of U.S. Provisional Patent Application No. 60/850,387, filed on Oct. 10, 2006, and U.S. Provisional Patent Application No. 60/850,424, filed on Oct. 10, 2006, which are hereby incorporated by reference in their entirety.

BACKGROUND OF THE INVENTION

The present invention relates to measurements and data analyses, and, more specifically, to the generation of analytic measurements and to their application to real phenomena.

Data analyses that employ mathematics and statistics in analyses of measurements of real phenomena have proven to be useful in many areas, including, for example, medicine, public health, economy, industry, and education.

This invention focuses on measurements of real phenomena. Real phenomena refer here to factual and non-abstract phenomena, including, for example, tangible, material, living, non-living, or artificial things (like an animal, plant, chair, car, or engine) as well as events, places, conditions, structures, or processes (like a day, a country, income, or infant mortality). A measurement is the act or process of measuring; it is a number, figure, extent, or amount obtained by measuring. Measurements of real phenomena can be listed in one list or multiple lists of measurements; one list of measurements is univariate, multiple lists of measurements are multivariate.

Multivariate analysis is a data analysis of more than one variable. Therefore, multivariate analyses analyze multiple lists; they do not analyze a single list. Factor analysis, principal components analysis, cluster analysis, and regression analysis are examples of multivariate analyses of multiple lists of numbers (Everitt 1993; Hartigan 1975; Hotelling 1933; Pearson 1901; Rencher 2002; Spearman 1904).

The present invention focuses on the multivariate analyses of a univariate list of measurements of distinct real phenomena.

Transformations of univariate lists to matrices are common, and are found in many areas. For example, distance $d_{jk}$ between numbers $x_j$ and $x_k$ can be computed with $d_{jk}=|x_j-x_k|$, and matrix D containing $n^2$ cells containing distances $d_{jk}$ can be constructed where $j=1:n$ and $k=1:n$. Similar matrices are commonly constructed for distances between points in or on a geometric structure or distance between points in a specific space (e.g., n-dimensional Euclidean space) or distance between two vertices of a graph. The geodesic distance between two points is a locally length-minimizing curve (i.e., it is the shortest distance between the two points, and the shortest path that a particle which is not accelerating would follow between the two points). For example, in the plane, the geodesic distance between two points is a straight line, and the geodesic distance between two points on a sphere is the segment that connects them in the great circle of this sphere (e.g., the equator of a spherical planet). Geodesic distance between points is typically computed using geometric theorems, rules, or methods (e.g., the Pythagorean Theorem for computing the geodesic distance between two points in the plain); computations of geodesic distances between points may also be implemented in various global positioning systems, GPS, and diverse computer programs. In graph theory, a geodesic distance between two vertices is the number of edges in the shortest path connecting them.

A list of numbers can also be transformed to multiple lists of numbers using spectral, wavelets, or polynomial transformations (Fourier 1822; Gheondea and Sabac 2003; López-Gómez 2001; Mathworld 2006; Meyer 1992; Percival and Walden 2000). Spectral, wavelets, or polynomial transformations of lists of numbers typically change the numbers in each list and increase the number of lists. For example, a 2-degrees orthonormal polynomial transformation of list x that is denoted by $x=(x_1, \ldots, x_n)$ for n numbers $x_i$ where $i=1:3$ such that $x=(1, 2, 3)$ produces two lists of numbers: $x'_1=(-0.7071068, 0.0000000, 0.7071068)$ and $x'_2=(0.4082483, -0.8164966, 0.4082483)$ that are also two columns of a 3*2 matrix. The orthonormal polynomial transformation in this example illustrates a transformation of one list to two lists and also a transformation of one list to a matrix. Orthonormality in this example indicates that the orthonormal polynomial transformation produced lists wherein each list has specific internal characteristics (e.g., normality) and wherein interrelationships among lists have specific characteristics (e.g., orthogonality).

A transformation of a list of numbers to another list of numbers replaces these numbers by other numbers. For example, if an original list that is denoted by $x=(x_1, \ldots, x_n)$ for n numbers $x_i$ where $i=1:3$ such that $x=(1, 2, 3)$ is transformed to a new list that is denoted by $x'=(x'_1, \ldots, x'_n)$ for n numbers $x'_i$ using $x'_i=x_i^2$ then $x'=(1, 4, 9)$, which is an example of a power transformation of list x using a power of 2. This is also an example of a transformation of one list to another list. Power transformations are one of the most popular methods of transformation of a list of numbers to another list of numbers (Emerson 1983; Emerson and Stoto 1983).

Multivariate analyses and data mining focus on more than one list, seeking to classify, reduce, make sense of, or handle or manage a plurality of lists. They typically do so by reducing the number of lists. For example, factor analysis or principal components analysis transform lists, reduce the number of lists, and elicit, refine, or augment the meaning of lists (Hotelling 1933; Pearson 1901; Rencher 2002; Spearman 1904), and cluster analysis enables analysts to identify groups within lists (Everitt 1993; Hartigan 1975).

The foregoing considerations, and studies of transformations of lists, reveal that a list of numbers could change part, or no part, or all of the components of this list. A transformation of a list could also leave intact or increase or reduce the number of lists. For example, a power transformation of one list of numbers typically changes these numbers, and power transformations of more than one list of numbers tend to leave intact the number of lists. An identity transformation of a list of numbers (e.g., a power transformation with a power of 1) does not change the numbers of this list, and identity transformations of lists of numbers do not change the number of lists.

Transformations of a list of numbers could offer diverse benefits in data analysis. For example, transformations of lists of numbers could linearize data or generate nonlinear data, increase symmetry or normality, increase homoscedasticity or reduce heteroscedasticity, orthogonalize or otherwise reposition variables, deepen insight into the data, simplify analysis, reveal new dimensions, and reveal meanings (Emerson 1983; Emerson and Stoto 1983; Rencher 2002).

Because they have diverse beneficial uses, transformations can be evaluated, compared, and optimized in order to assess which transformation would produce optimal results. For example, it is possible to compare various power transformations of a list of numbers for the purpose of discovering which of these transformations would produce an optimal result in a specific data analysis (Box and Cox 1964; Emerson 1983; Emerson and Stoto 1983).

While some transformation methods (e.g., power transformations) are simple or straight forward, or mechanized to diverse degrees, other transformation methods are complicated. For example, spectral or wavelets analyses typically require special transforms and complex calculations that limit the scope and applicability of these methods. Another drawback of the available methods of transformation is that they may not allow the user sufficient control, maneuverability, and tractability in the performance of the transformation or analysis. Additionally, some transformations may lack a theoretical foundation or a methodological justification that would explain why specific transformations ought to be used.

The multiple lists of numbers that result from spectral, wavelets, or polynomial transformations of one or more lists of numbers could, in turn, be used in multivariate analyses or data mining (Gheondea and Sabac 2003; López-Gómez 2001; Meyer 1992; Percival and Walden 2000).

This invention focuses on the following: lists of measurements of distinct real phenomena, the power transformations of these measurements to respective power transformed distances or proximities among these measurements, the multivariate analyses of vectors of matrices of these power transformed distances or proximities, and the application of analytic measurements from these analyses to real phenomena.

Epelbaum (2005) presents features of this invention and its embodiments in two studies. In one study of Epelbaum (2005), the real phenomena are the first 100 days of 1981 and the solar flux during these days. The days are measured in terms of the consecutive integer indices of these days, and the solar flux is measured by the adjusted solar activity indices, at a wavelength of 10.7 centimeters, in the first 100 days of 1981, collected by the Solar Radio Monitoring Programme of the Canadian National Research Council. Factor analyses of the power transformed distances among these 100 days yielded best fitting and optimal factor score measurements of these days. Generalized estimating equations, GEEs, analyses of effects of these factor scores on respective solar flux contribute to the understanding of solar flux and its changes through time and enable prediction of solar flux in the first 100 days of 1981. GEE is a regression analysis of correlated data. In another study of Epelbaum (2005), the real phenomena are the spatial distributions of U.S. states and the income per capita in these states. The spatial configurations are measured in terms of the centroids of these U.S. states, and the per capita incomes in these states in measured in terms of income data from the U.S. Census. Reiterated factor analyses of the power transformed distances among the centroids of U.S. states yield best fitting and optimal factor scores for the respective spatial positions of the respective states. GEE analyses of effects of factor scores on per capita income contribute to the understanding spatial differences in income per capita in U.S. states in 1990 and to the prediction of this income per capita.

The present invention formalizes, generalizes, refines, extends, broadens, and adds new uses to what the inventor presented in Epelbaum (2005).

BRIEF SUMMARY OF THE INVENTION

The disclosed invention provides a method for generating and applying analytic measurements.

BRIEF DESCRIPTION OF THE DRAWINGS

The present invention can be more fully understood by reading the subsequent detailed description in conjunction with the examples and references made to the accompanying drawings.

FIG. 2 illustrates sections of some of the lists of measurements that were power transformed to matrices of power transformed distances in the embodiment of the invention.

FIG. 3 presents the optimal specifications of the transformations in the embodiment of the invention.

DETAILED DESCRIPTION

The disclosed invention is embodied in data analyses of effects of race, gender, income, educational attainment, state of residence, and population size on infant mortality in U.S. states 2000. This embodiment uses, and forwards, transmits, and receives results of multivariate analyses by computing devices, computer displays, computer systems, computer-readable media, and printing apparatuses, and uses the Stata software (StataCorp, 2001).

Previous research shows that data analyses of effects of race, gender, income, educational attainment, state of residence, and population size on mortality in U.S. states 2000 are useful for public health policy and intervention. However, the validity and reliability of previous research is limited because few studies allow and accommodate correlated response data, unobserved heterogeneity, overdispersion, and correlated influential factors, and because previous research does not provide mathematical specifications and graphic depictions of multifaceted, multidimensional, nonlinear, and distinct effects on mortality. The embodiment of the invention could improve the validity and reliability of data analyses of mortality, and thus increase their usefulness for public health policy and intervention.

Figure 1:
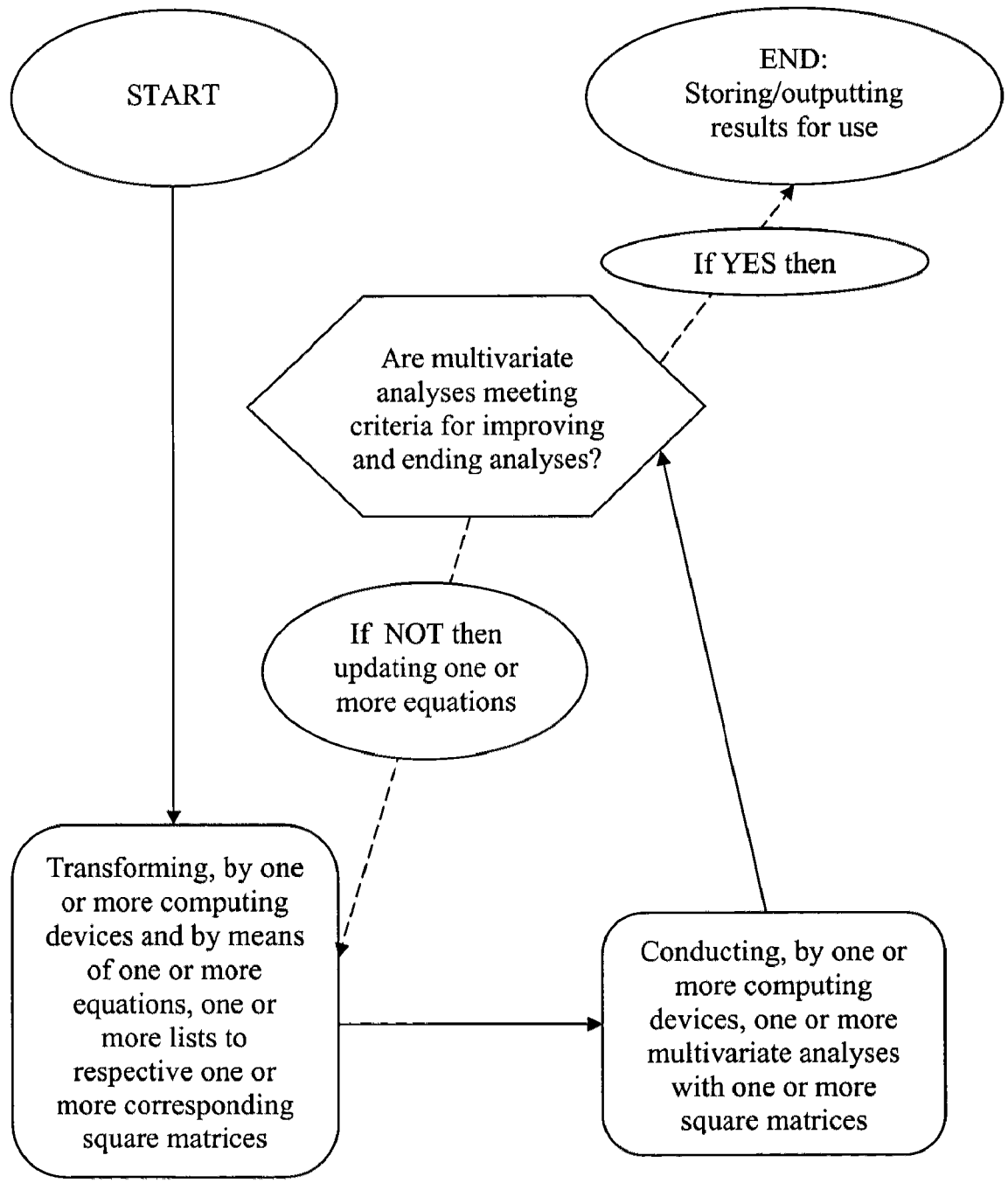
FIG. 1 provides a flowchart for embodiments of the disclosed invention.

The present embodiment of the invention follows the steps that are detailed in the flowchart in FIG. 1. Selections from some of the original lists for this embodiment are illustrated in FIG. 2. The original lists include a list of counts of dead infants and a list of counts of live births by 3 categories of race (i.e., African American, White, or Other), 2 categories of gender (i.e., female or male), and 51 categories of U.S. state of residence (i.e., 51 U.S. states, including the District of Columbia) in U.S. states 2000. Counts of deaths and counts of live births were compiled in two lists of 3*2*51=306 cases of counts of deaths and live births of infants in U.S. states 2000. Thus, the length n of the list of counts of deaths is n=306, and the length n of the list of counts of live births is also n=306, where n denotes the length of each list. Three corresponding lists of categories of race, gender, and U.S. state of residences were constructed, and were also set to lengths n=306. Each position in these lists was designated as a unit of analysis with an integer u, where u=1:n, where u refers to a unit of real phenomena as well as a unit of data analysis. Each list also constitutes a variable. The count of deaths in u was designated as variable $D_u$, designating the real phenomenon of gender-specific, race-specific, and state-specific infant mortality and its original measurement in terms of counts. Race in u was designated with variable $R_u$, designating the real phenomenon of race of individuals, and its original signification in terms of a racial category. Gender in u was designated with variable $G_u$, designating the real phenomenon of gender of individuals, and its original signification in terms of a gender category. State of residence in u was designated with variable $S_u$, designating the real phenomenon of U.S. state of residence of individuals. and its original signification in terms of a nominal category. The count of live births in u was designated with variable $L_u$, designating the real phenomenon of gender-specific, race-specific, state-specific live births and its original measurement in terms of counts of live births. These variables correspond, respectively, to corresponding lists of real phenomena and lists of their measurements that were designated as d, r, g, s, and l.

Additional original lists for data analysis include state-level aggregate data for the year 2000 from the U.S. Census for the year 2000 (U.S. Census 2006), including: income per capita of all persons, designated with IPCAP, in 51 states; race-specific income per capita, designated with RSIPC, in 51 states by three racial categories; proportion of a state's households in interval q of household income, designated with $HA_q$, where q=1:16 in 51 states; proportion of a state's race-specific households in interval q of household income, designated with $HR_q$, where q=1:16 in 51 states by three racial categories; proportion of a state's population aged 25 or older in interval q of educational attainment, designated with $EA_q$, where q=1:16 in 51 states; and proportion of a state's race-and-gender-specific population aged 25 or older in interval q of educational attainment, designated with $RGSEA_q$, where q=1:7 in 51 states by three racial categories by two gender categories. In preparation for data analyses, the state level lists are compiled in lists of variable lengths. These lists include one list of IPCAP of length n=51, one list of RSIPC of length n=153, 16 lists of $HA_{qu}$ of length n=51, 16 lists of $HR_q$ of length n=153, 16 lists of $EA_q$ of length n=51, and 7 lists of $RGSEA_q$ of length n=306.

Previous research shows that mortality models tend to be characterized by heterogeneity and extra-Poisson variation (Brillinger 1986; Manton, Woodbury, and Stallard 1981, 1983; Manton and Stallard 1984a, 1984b). Therefore, the negative binomial was used in the model for infant mortality, allowing and accommodating heterogeneity and extra-Poisson variation through employment of the negative binomial's alpha coefficient and gamma function. These procedures follow a previous study by Manton, Woodbury, and Stallard (1981) and subsequent considerations (Brillinger 1986; Lawless 1987; Manton, Woodbury, and Stallard 1983; Manton and Stallard 1984a, 1984b; Mullahy 1997).

To account for dependence among mortality counts, a negative binomial Generalized Estimating Equation, GEE, model was formulated. GEEs and the employment of the working correlations structures in data analyses of dependent or clustered data are described in Hardin and Hilbe (2003).

A negative binomial GEE model for effects on $D_u$ was formulated following previous work that is presented in Epelbaum (2005), to account for correlated influential factors, and to provide mathematical specifications and graphic depictions of multifaceted, multidimensional, nonlinear, and distinct effects on infant mortality. This model is formulated with $$D_u = \exp(\alpha) * \prod_{v=1}^{V} \exp(\beta_v F_{vu}) * \exp(\varepsilon_u),$$

for effects of orthogonal factors $F_v$ on infant death counts, $D_u$, where $\alpha$ and $\beta_v$ are GEE coefficients from the negative binomial GEE model, and where $\epsilon_u$ is the error term for unit u of this model. The model postulates V orthogonal factors $F_v$ that were constructed with the embodiment of the invention. The GEE analysis employs a working correlations matrix to account for dependency among infant death counts.

Univariate lists were transformed to multivariate matrices for use in the right-hand side of the negative binomial GEE model for effects on infant mortality. Most of the same univariate lists were also transformed to other matrices for use in the working correlations matrix of the same model. One univariate list, list 1 that is presented next, was transformed to a matrix that was used in the right-hand side of this model and in the working correlation matrix of this model.

List l of length n=306 designating the real phenomena of gender-specific, race-specific, and U.S. state-specific live births, and designating the respective measurements of these real phenomena in terms of counts of live births (i.e., l=11, 109; 261; . . . ; 3,209), parts of which are illustrated in column 8 of FIG. 2, was power transformed to list l' using the equation $l'_i = l_i^\phi$ for i=1:n, and list l' was transformed to a square matrix D of $n^2$ distances $d_{jk}$ using the equation $d_{jk} = |l_j - l_k|$ for j=1:n and k=1:n, and matrix D was power transformed to its corresponding matrix P of proximities $p_{jk}$ using the equation $p_{jk} = [1 - d_{jk}/\max(d \ldots)]^\theta$ for j=1:n and k=1:n where $\max(d \ldots)$ refers to the maximal element $d_{jk}$ in matrix D. Matrix P can also be constructed employing a single power transformation equation $p_{jk} = [1 - |l_j^\phi - l_k^\phi|/\max(|l_j^\phi - l_k^\phi| \ldots)]^\theta$ for j=1:n and k=1:n. Matrix P of size $n^2 = 306^2$ was designated as matrix L for proximities among counts of live births. Thus, a univariate list l of length n=306 was power transformed to an $n^2 = 306^2$ square matrix L of $306^2$ proximity coefficients $p_{jk}$; matrix L has two manipulable power coefficients $\phi$ and $\theta$ whose specified values varied in data analyses.

List g of length n=306 for gender (i.e., g=Male, Male, . . . Female), parts of which are illustrated in column 4 of FIG. 2, designates the gender of gender-specific and race-specific aggregates of individuals in a specific U.S. state. This original list was transformed to two identical lists f and m using identity transformations. List f, for females, was subsequently transformed to list f' using Female=0.5 and Male=0 resulting in numbers $f'_i$ where i=1:n. Similarly, list m, for males, was transformed to list m' using Male=0.5 and Female=0 resulting in numerical measurements $m'_i$ where i=1:n. Numerical lists f' and m' were subsequently retransformed to two respective columns of a matrix FM, that was subsequently power retransformed to matrix G using $G=(FM)^\theta$. Thus, a univariate list g of gender categories was transformed to a matrix G of measurements of gender, such that matrix G had two columns of length 306, and one manipulable power coefficient $\theta$ whose specified values varied in data analyses.

In another sense, it is possible to consider a list g' of length n=2 for gender (i.e., g'=Male, Female) where the real phenomena are the gender of gender-specific and race-specific aggregates of individuals in a specific U.S. state. Transformation of list g' to f' using Female=0.5 and Male=0 results in numbers $f'_i$ where i=1:n, and transformation of list g' to m' using Male=0.5 and Female=0 results in numbers in $m'_i$ where i=1:n, yielding a 2 by 2 matrix F'M', that was then further power retransformed using $G'=(F'M')^\theta$. A row-binding of 153(F'M')$^\theta$ matrices yields the 306 by 2 matrix $G=(FM)^\theta$ for said 306 real phenomena consisting of power transformed measurements of the gender of gender-specific and race-specific aggregates of individuals in 51 U.S. states.

List r of length n=306 for race (i.e., r=African American, African American, . . . White), parts of which are illustrated in column 3 of FIG. 2, designates the race of gender-specific and race-specific aggregates of individuals in a specific U.S. state. This original list was transformed to three identical lists ra, ro, and rw using identity transformations. List ra, for African Americans, was subsequently transformed to list ra' using African American=0.5, Other=0, and White=0 resulting in numerical measurements $ra'_i$ where i=1:n. Similarly, list ro, for Other, was subsequently transformed to list ro' using African American=0, Other=0.5, and White=0 resulting in numerical measurements $ro'_i$ where i=1:n. Additionally, list rw, for White, was subsequently transformed to list rw' using African American=0, Other=0, and White=0.5 resulting in numerical measurements $rw'_i$ where i=1:n. Numerical lists ra', ro', and rw' were subsequently retransformed to three respective columns of a matrix AOW, that was subsequently retransformed to matrix R using $R=(AOW)^\theta$. Thus, a univariate list r of race categories was transformed to a matrix R of measurements of race, such that matrix R had three columns of length 306, and one manipulable power coefficient $\theta$ whose specified values varied in data analyses.

In another sense, it is possible to consider a list r' of length n=3 for race (i.e., r'=African American, Other, White), where the real phenomena are the race of gender-specific and race-specific aggregates of individuals in a specific U.S. state. Transformation of a respective list ra, ro, or rw yields a 3 by 3 respective matrix RA, RO, or RW, that can be further power retransformed using $(RA)^\theta$, $(RO)^\theta$, or $(RW)^\theta$. Row-binding 102 $(RA)^\theta$ matrices, 102 $(RO)^\theta$ matrices, and 102 $(RW)^\theta$ yields the 306 by 3 matrix $R=(AOW)^\theta$ for said 306 real phenomena consisting of the race of aggregates of gender-specific and race-specific aggregates of individuals in 51 U.S. states.

List s of length n=51 with 51 categories of names of U.S. states of residence (i.e., s=Alabama, Alaska, . . . , Wyoming), is partly illustrated in column 2 of FIG. 2. This list transformed to a corresponding list sp of 51 points that are indicated by centroids of U.S. states (i.e., sp=33.00N&-86.77W, 61.29N&-148.72W, . . . 42.68N&-107.01W), with data from the U.S. Census (2001), and is partly illustrated in columns 5 and 6 of FIG. 2. List sp was transformed to a square matrix D of $n^2$ geodesic distances $d_{jk}$ for j=1:n and k=1:n using a computer program written by Simons (2004) for computation of geodesic distances among points on earth. Matrix D was power transformed to a corresponding matrix D' of distances $d'_{jk}$ using equation $d'_{jk}=(d_{jk})^\phi$ for j=1:n and k=1:n, and matrix D' was power transformed to a corresponding matrix P of proximities $p_{jk}$ using equation $p_{jk}=[1-d'_{jk}/\max(d' \ldots)]^\theta$ for j=1:n and k=1:n where max(d' . . . ) refers to the maximal element $d'_{jk}$ in matrix D'. Matrix P can also be constructed employing a single power transformation equation $p_{jk}=[1-(d_{j/k})^\phi/\max((d_{jk})^\phi \ldots)]^\theta$ for j=1:n and k=1:n. Matrix P of size $n^2=51^2$ was designated as matrix S for spatial proximities among U.S. states. Six identical matrices S were row-bound and were thus transformed to a new matrix S' of 51 columns of length 306, which were treated as 51 lists of length 306. Thus, a univariate list s of 51 U.S. states' categories was power transformed to a $51^2$ matrix S of proximities among pairs of U.S. states, allowing for identities. Matrix S has two manipulable power coefficients $\phi$ and $\theta$ whose specified values varied in data analyses. Matrix S is then further retransformed to a matrix S' that has 51 columns of length 306.

List ipc of length n=51, of measurements of income per capita of all persons by U.S. state 2000 (i.e., ipc=18,188.85; 22,659.75; . . . ; 19,133.95), was power transformed to list ipc' using equation $ipc'_i=ipc_i^\phi$ for i=1:n, and list ipc' was transformed to a square matrix D of $n^2$ distances $d_{jk}$ using $d_{jk}=|ipc'_j-ipc'_k|$ for j=1:n and k=1:n, and matrix D was power transformed to its corresponding matrix P of proximities $p_{jk}$ using equation $p_{jk}=[1-d_{jk}/\max(d \ldots)]^\theta$ for j=1:n and k=1:n where max(d . . . ) refers to the maximal element $d_{jk}$ in matrix D. Matrix P can also be constructed employing a single power transformation equation $p_{jk}=[1-|ipc_j^\phi-1pc_k^\phi|/\max(|ipc_j^\phi-rsipc_k^\phi| \ldots)]^\theta$ for j=1:n and k=1:n. Matrix P of size $n^2=51^2$ was designated as matrix IPC for proximities among income per capita in 51 U.S. states. Six identical matrices IPC were row-bound and were thus transformed to a new matrix IPC' of 51 columns of length 306, which were treated as 51 lists of length 306. Thus, a univariate list ipc of measurements of incomes per capita in 51 U.S. states was power transformed to a $51^2$ matrix IPC of proximities among pairs of U.S. states, allowing for identities. Matrix IPC has two manipulable power coefficients $\phi$ and $\theta$ whose specified values varied in data analyses. Matrix IPC is then further retransformed to a matrix IPC' that has 51 columns of length 306.

List rsipc of length n=153, of measurements of race specific income per capita of all persons by U.S. state 2000 (i.e., rsipc=11,664.61; 18,512.93; . . . ; 19,700.16), was power transformed to list rsipc' using equation $rsipc'_i=rsipc_i^\phi$ for i=1:n, and list rsipc' was transformed to a square matrix D of $n^2$ distances $d_{jk}$ using $d_{jk}=|rsipc'_j-rsipc'_k|$ for j=1:n and k=1:n, and matrix D was power transformed to its corresponding matrix P of proximities $p_{jk}$ using $p_{jk}=[1-d_{jk}/\max(d \ldots)]^\theta$ for j=1:n and k=1:n where max(d . . . ) refers to the maximal element $d_{jk}$ in matrix D. Matrix P can also be constructed employing a single power transformation equation $p_{jk}=[1-|rsipc_j^\phi-rsipc_k^\phi|/\max(|rsipc_j^\phi-rsipc_k^\phi| \ldots)]^\theta$ for j=1:n and k=1:n. Matrix P of size $n^2=153^2$ was designated as matrix RSIPC for proximities among income per capita in 51 U.S. states. Two identical matrices RSIPC were row-bound and were thus transformed to a new matrix RSIPC' of 153 columns of length 306, which were treated as 153 lists of length 306. Thus, a univariate list rsipc of measurements of race-specific incomes per capita in 51 U.S. states was power transformed to a $153^2$ matrix RSIPC of proximities among pairs of U.S. states, allowing for identities. Matrix RSIPC has two manipulable power coefficients $\phi$ and $\theta$ whose specified values can be varied in data analyses. Matrix IPC is then further retransformed to a matrix RSIPC' that has 153 columns of length 360.

Sixteen lists $ha_q$ of length n=51 for proportion of a state's households in interval q of household income, where q=1:16 (i.e., $ha_1$=0.144, 0.056, . . . 0.091; . . . ; $ha_{16}$=0.014, 0.019, . . . 0.013), were transformed to a matrix HA of size 51*16 using $ha_q$ as respective 16 columns of said matrix HA, where q=1:16. Matrix HA was transformed to matrix HA' using $HA'=(HA)^\theta$, and six identical matrices HA' were row-bound and were thus transformed to a new matrix HA'' of 16 columns of length 306, which were treated as 16 lists of length 306. Thus, sixteen univariate lists $ha_q$ were transformed to a multivariate matrix HA'' that has one manipulable mathematical coefficient $\theta$ whose specified values can be varied in data analyses.

Sixteen lists $hr_q$ of length n=153 for proportion of a state's race-specific households in interval q of race-specific household income, where q=1:16 (i.e., $hr_1$=0.25, 0.060, . . . 0.087; . . . ; $hr_{16}$=0.006, 0.006, . . . 0.013), were transformed to a matrix HR of size 153*16 using $hr_q$ as respective 16 columns of said matrix HR, where q=1:16. Matrix HR was transformed to matrix HR' using HR'=(HR)$^\theta$, and two identical matrices HR' were row-bound and were thus transformed to a new matrix HR" of 16 columns of length 306, which were treated as 16 lists of length 306. Thus, sixteen univariate lists $hr_q$ were transformed to a multivariate matrix HR" that has one manipulable mathematical coefficient $\theta$ whose specified values can be varied in data analyses.

Sixteen lists $ea_q$ of length n=51 for proportions of a state's population aged 25 or older in interval q of educational attainment, where q=1:16 (i.e., $ea_1$=0.012, 0.008, . . . 0.004; . . . ; $ea_{16}$=0.007, 0.009, . . . 0.008), were transformed to a matrix EA of size 51*16 using $ea_q$ as respective 16 columns of said matrix EA, where q=1:16. Matrix EA was transformed to matrix EA' using EA'=(EA)$^\theta$, and six identical matrices EA' were row-bound and were thus transformed to a new matrix EA" of 16 columns of length 306, which were treated as 16 lists of length 306. Thus, sixteen univariate lists $ea_q$ were transformed to a multivariate matrix EA" that has one manipulable mathematical coefficient $\theta$ whose specified values can be varied in data analyses.

Seven lists $rgsea_q$ of length n=306 for proportions of a state's race-and-gender-specific population aged 25 or older in interval q of educational attainment, where q=1:7 (i.e., $rgsea_1$=0.114, 0.026, . . . 0.025; . . . ; $rgsea_7$=0.031, 0.051, . . . 0.059), were transformed to a matrix RGSEA of size 306*7 using $rgsea_q$ as respective 7 columns of said matrix RGSEA, where q=1:7. Matrix RGSEA was transformed to matrix RGSEA' using RGSEA'=(RGSEA)$^\theta$, resulting in a new matrix RGSEA' of 7 columns of length 306, which were treated as 7 lists of length 306. Thus, seven univariate lists $rgsea_q$ were transformed to a multivariate matrix RGSEA' that has one manipulable mathematical coefficient $\theta$ whose specified values can be varied in data analyses.

The matrices that were presented above were employed in the right-hand side of the negative binomial GEE model for effects on infant mortality. The matrices that are presented next were employed in the working correlations matrix of this model.

List g of length n=306 for gender (i.e., g=Male, Male, . . . Female), parts of which are illustrated in column 4 of FIG. 2, was transformed to list g' using Female=2 and Male=1 resulting in numbers $g'_i$ where i=1:n. List g' was transformed to a square matrix D of $n^2$ distances $d_{jk}$ using $d_{jk}$=|$g'_j$−$g'_k$| for j=1:n and k=1:n. Matrix D was transformed to its corresponding matrix P of proximities $p_{jk}$ using $p_{jk}$=0.5 when $d_{jk}$=1, and $p_{jk}$=1 when $d_{jk}$=0, for j=1:n and k=1:n. Matrix P was transformed to its corresponding matrix P' of proximities $p'_{jk}$ using $p''_{jk}$=($p'_{jk}$)$^\theta$ for j=1:n and k=1:n. Matrix P' was designated as matrix G■ for proximities among gender categories. Matrix G■ is a square matrix of 306 rows, 306 columns, and a diagonal of ones. Thus, a univariate list g was transformed to a multivariate matrix G■ with a manipulable mathematical coefficient $\theta$ whose specified values can be varied in data analyses.

List r of length n=306 for race (i.e., r=African American, African American, . . . White), parts of which are illustrated in column 3 of FIG. 2, was transformed to list r' using African American=3, Other=2, and White=1 resulting in numbers $r'_i$ where i=1:n. List r' was transformed to a square matrix D of $n^2$ distances $d_{jk}$ using $d_{jk}$=|$r'_j$−$r'_k$| for j=1:n and k=1:n. Matrix D was transformed to its corresponding matrix P of proximities $p_{jk}$ using $p_{jk}$=0.5 when $d_{jk}$>0, and using $p_{jk}$=1 when $d_{jk}$=0, for j=1:n and k=1:n. Matrix P was transformed to its corresponding matrix P' of proximities $p'_{jk}$ using $p''_{jk}$=($p'_{jk}$)$^\theta$ for j=1:n and k=1:n. Matrix P' was designated as matrix R■ for proximities among racial categories. Matrix R■ is a square matrix of 306 rows, 306 columns, and a diagonal of ones. Thus, a univariate list r was transformed to a multivariate matrix R■ with a manipulable mathematical coefficient $\theta$ whose specified values can be varied in data analyses.

Column-binding of six identical matrices S', each with 51 lists of length 306 and two manipulable mathematical coefficients $\phi$ and $\theta$ whose specified values can be varied in data analyses, resulted in their transformation to a new matrix S■. Matrix S■ has 306 columns of length 306 and one manipulable mathematical coefficient $\theta$ whose specified values can be varied in data analyses. Thus, a univariate list s of categories was transformed to a multivariate matrix S■ of numbers that has two manipulable mathematical coefficients $\phi$ and $\theta$ whose specified values can be varied in data analyses.

Column-binding of six identical matrices IPC', each with 51 lists of length 306 and two manipulable mathematical coefficients $\phi$ and $\theta$ whose specified values can be varied in data analyses, resulted in their transformation to a new matrix IPC■. Matrix IPC' has 306 columns of length 306 and two manipulable mathematical coefficients $\phi$ and $\theta$ whose specified values can be varied in data analyses. Thus, a univariate list ipc of numbers was transformed to a multivariate matrix IPC■ that has two manipulable mathematical coefficients $\phi$ and $\theta$ whose specified values can be varied in data analyses.

Column-binding of two identical matrices RSIPC', each with 153 lists of length 306 and two manipulable mathematical coefficients $\phi$ and $\theta$ whose specified values can be varied in data analyses, resulted in their transformation to a new matrix RSIPC■ of 306 columns of length 306 and two manipulable mathematical coefficients $\phi$ and $\theta$ whose specified values can be varied in data analyses. Thus, a univariate list rsipc of numbers was transformed to a multivariate matrix RSIPC■ that has two manipulable mathematical coefficients $\phi$ and $\theta$ whose specified values can be varied in data analyses.

Each of the sixteen lists $ha_q$ of length n=51 for proportion of a state's households in interval q of household income, where q=1:16 (i.e., $ha_1$=0.144, 0.056, . . . 0.091; . . . ; $ha_{16}$=0.014, 0.019, . . . 0.013), was transformed to a square matrix $D_q$ of $n^2$ distances $d_{qjk}$ using $d_{qjk}$=|$ha_{qj}$−$ha_{qk}$| for j=1:n and k=1:n, and matrix $D_q$ was transformed to its corresponding matrix $P_q$ of proximities $p_{qjk}$ using $p_{qjk}$=[1−$d_{qjk}$/max(d . . . )] for j=1:n and k=1:n where max(d . . . ) refers to the maximal element $d_{qjk}$ in matrix $D_q$. Row-binding matrix $P_q$ of 51 columns of lengths 51 six times produces a new matrix $P_q$' of 51 columns of lengths 306. Column-binding matrix $P_q$' of 51 columns of lengths 306 six times produces a new matrix $P_q$" of 306 columns of lengths 306. Repeating these transformations 16 times for q=1:16, produces 16 matrices $P_q$" of 306 columns of lengths 306 where q=1:16. Adding the 16 matrices $P_q$" produces a new matrix that was designated here as matrix HA that has 306 columns of length 306, which were treated as 306 lists of length 306. Matrix HA was transformed to matrix HA■ using HA■=(HA)$^\theta$. Thus, 16 univariate lists $ha_q$ were transformed to a multivariate matrix HA■ that has one manipulable mathematical coefficient $\theta$ whose specified values can be varied in data analyses.

Each of the sixteen lists $hr_q$ of length n=153 for proportion of a state's race-specific households in interval q of race-specific household income, where q=1:16 (i.e., $hr_1$=0.25, 0.060, . . . 0.087; . . . ; $hr_{16}$=0.006, 0.006, . . . 0.013), was transformed to a square matrix $D_q$ of $n^2$ distances $d_{qjk}$ using $d_{qjk}$=|$hr_{qj}$−$hr_{qk}$| for j=1:n and k=1:n, and matrix $D_q$ was transformed to its corresponding matrix $P_q$ of proximities $p_{qjk}$ using $p_{qjk}=[1-d_{qjk}/\max(d\ldots)]$ for j=1:n and k=1:n where $\max(d\ldots)$ refers to the maximal element $d_{qjk}$ in matrix $D_q$. Row-binding matrix $P_q$ of 153 columns of lengths 153 two times produces a new matrix $P_q{'}$ of 153 columns of lengths 306. Column-binding matrix $P_q{'}$ of 153 columns of lengths 306 two times produces a new matrix $P_q{''}$ of 306 columns of lengths 306. Repeating these transformations 16 times for q=1:16, produces 16 matrices $P_q{''}$ of 306 columns of lengths 306 where q=1:16. Adding the 16 matrices $P_q{''}$ produces a new matrix that was designated here as matrix HR that has 306 columns of length 306, which were treated as 306 lists of length 306. Matrix HR was transformed to matrix HR■ using HR■=(HR)$^\theta$. Thus, 16 univariate lists $hr_q$ were transformed to a multivariate matrix HR■ that has one manipulable mathematical coefficient $\theta$ whose specified values can be varied in data analyses.

Each of the sixteen lists $ea_q$ of length n=51 for proportions of a state's population aged 25 or older in interval q of educational attainment, where q=1:16 (i.e., $ea_1$=0.012, 0.008, ... 0.004; ...; $ea_{16}$=0.007, 0.009, ... 0.008), was transformed to a square matrix $D_q$ of $n^2$ distances $d_{qjk}$ using $d_{qjk}=|ea_{qj}-ea_{qk}|$ for j=1:n and k=1:n, and matrix $D_q$ was transformed to its corresponding matrix $P_q$ of proximities $p_{qjk}$ using $p_{qjk}=[1-d_{qjk}/\max(d\ldots)]$ for j=1:n and k=1:n where $\max(d\ldots)$ refers to the maximal element $d_{qjk}$ in matrix $D_q$. Row-binding matrix $P_q$ of 51 columns of lengths 51 six times produces a new matrix $P_q{'}$ of 51 columns of lengths 306. Column-binding matrix $P_q{'}$ of 51 columns of lengths 306 six times produces a new matrix $P_q{''}$ of 306 columns of lengths 306. Repeating these transformations 16 times for q=1:16, produces 16 matrices $P_q{''}$ of 306 columns of lengths 306 where q=1:16. Adding the 16 matrices $P_q{''}$ produces a new matrix that was designated as matrix EA that has 306 columns of length 306, which were treated as 306 lists of length 306. Matrix EA was transformed to matrix EA■ using EA■=(EA)$^\theta$. Thus, 16 univariate lists $ea_q$ were transformed to a multivariate matrix EA■ that has one manipulable mathematical coefficient $\theta$ whose specified values can be varied in data analyses.

Each of the seven lists $rgsea_q$ of length n=306 for proportions of a state's race-and-gender-specific population aged 25 or older in interval q of educational attainment, where q=1:7 (i.e., $rgsea_1$=0.114, 0.026, ... 0.025; ...; $rgsea_7$=0.031, 0.051, ... 0.059), was transformed to a square matrix $D_q$ of $n^2$ distances $d_{qjk}$ using $d_{qjk}=|rgsea_{qj}-rgsea_{qk}|$ for j=1:n and k=1:n, and matrix $D_q$ was transformed to its corresponding matrix $P_q$ of proximities $p_{qjk}$ using $p_{qjk}=[1-d_{qjk}/\max(d\ldots)]$ for j=1:n and k=1:n where $\max(d\ldots)$ refers to the maximal element $d_{qjk}$ in matrix $D_q$. Repeating these transformations 7 times for q=1:7, produces 7 matrices $P_q{''}$ of 306 columns of lengths 306 where q=1:7. Adding the 7 matrices $P_q{''}$ produces a new matrix that was designated as matrix RGSEA that has 306 columns of length 306, which were treated as 306 lists of length 306. Matrix RGSEA was transformed to matrix RGSEA■ using RGSEA■=(RGSEA)$^\theta$. Thus, 7 univariate lists $rgsea_q$ were transformed to a multivariate matrix RGSEA■ that has one manipulable mathematical coefficient $\theta$ whose specified values can be varied in data analyses.

A 306*306 matrix with a diagonal of ones and 0.5 in all other cells was constructed and designated as matrix HH, in reference to homogeneity and heterogeneity. Matrix HH was then transformed to matrix HH■ using HH■=(HH)$^\theta$. Matrix HH■ is constructed under the assumption that infants' mortality in the 306 units u is partly homogeneous in so far as infants' mortality responses in units u in the U.S. are similar to each other and differ from other phenomena. For example, infants' mortality responses in units u in the U.S. differ from corresponding mortality responses of other age groups in the U.S. or elsewhere, from mortality responses elsewhere, or from mortality responses of other species.

The 306 lists of matrix L, 2 lists of matrix G, 3 lists of matrix R, 51 lists of matrix S', 51 lists of matrix IPC', 153 lists of matrix RSIPC', 16 lists of matrix HA'', 16 lists of matrix HR'', 16 lists of matrix EA'', and 7 lists of matrix RGSEA' included specific manipulable mathematical coefficients φ or θ. The resulting specified 621 lists of length 306 were column-bounded in a new broad matrix that was designated as matrix B. Thus, the manipulable mathematical coefficients φ and θ of matrices L, G, R, S', IPC', RSIPC', HA'', HR'', EA'', and RGSEA' were incorporated into matrix B. Therefore, specified values of manipulable mathematical coefficients φ and θ could be manipulated in GEE analyses with matrix B.

A 306*306 matrix C was constructed using $$C = [(w_l^* L + w_g^* G^\blacksquare + w_r^* R^\blacksquare + w_s^* S^\blacksquare + w_{ipc}^* IPC^\blacksquare + w_{rsipc}^* RSIPC^\blacksquare + w_{ha}^* HA^\blacksquare + w_{hr}^* HR^\blacksquare + w_{ea}^* EA^\blacksquare + w_{rsgsea}^* RGSEA^\blacksquare + w_{hh}^* HH^\blacksquare)/W]^\Omega,$$

where $$W = (w_l + w_g + w_r + w_s + w_{ipc} + w_{rsipc} + w_{ha} + w_{hr} + w_{ea} + w_{rsgsea} + w_{hh}).$$

The manipulable mathematical coefficients φ, θ, Ω, w, and W that are associated with matrices L, G■, R■, S■, IPC■, RSIPC■, HA■, HR■, EA■, RGSEA■, and HH■ were incorporated into matrix C. Therefore, specified values of manipulable mathematical coefficients φ, θ, Ω, w, and W could be manipulated in GEE analyses with matrix C.

Matrix B was used in the construction of orthogonal factors $F_{vu}$ in the right-hand side of the negative binomial GEE model for infant mortality. Matrix C was used as the working correlations matrix for dependent data in this GEE model.

Two optimization criteria were employed in the GEE analyses. One optimization criterion was Lin's $\rho_c$ coefficient for the concordance correlation between observed and predicted $D_u$ (Lin 1989, 2000; Hardin and Hilbe 2003). The second optimization criterion was the minimization Pan's quasi-likelihood information criterion, QIC, for assessing appropriateness of the working correlation structure in GEE analyses (Pan 2001; Hardin and Hilbe 2003). Therefore, optimality and best fit were achieved with a calibration of the maximization of Lin's $\rho_c$ coefficient and the minimization of Pan's QIC.

Diverse types of factor analyses, with diverse rotations, and diverse factor scoring techniques, as well as principal components analysis, were conducted on matrix B, and were programmed to yield 90 or less factors or principal components in each analysis. Each factor or principal component yielded 360 factor scores or principal components scores corresponding to respective 360 real phenomena (i.e., in the present analysis, the real phenomena were 360 gender-specific. race-specific, and U.S. slate-specific aggregates of human individuals). Each factor or principal components also yielded 621 factor loadings or principal components loadings corresponding to respective 621 columns of specified distance coefficients of matrix B. General discussions on diverse procedures of factor analysis and principal components analysis are discussed in StataCorp (2001) and Rencher (2002). Each factor analysis or principal components analysis was followed here by negative binomial GEE analyses of effects of about ten factor scores variables or principle components scores variables on infant mortality, D. Lin's $\rho_c$ coefficient for the concordance correlation between observed and predicted D was computed following each negative binomial GEE analysis (Lin 1989, 2000; Hardin and Hilbe 2003). These factor analysis and GEE analyses were repeated with variable specifications of manipulable power coefficients $\phi$ or $\theta$ in the component matrices of matrix B. These analyses showed that factor analyses with principal factors, varimax rotation, and Thomson scoring maximize Lin's $\rho_c$ coefficient. Subsequently, principal factors, varimax Rotation, and Thomson scoring were used in all further factor analyses.

Additional factor analyses with principal factors, varimax rotation, and Thomson scoring were conducted on matrix B, using variable specifications of manipulable power coefficients $\phi$ or $\theta$ in the component matrices of matrix B. Each of the following manipulable power coefficients in the component matrices of matrix B was varied more than 6 times in these factor analyses: $\phi$ and $\theta$ in matrix L, $\theta$ in matrix G, $\theta$ in matrix R, $\phi$ and $\theta$ in matrix S', $\phi$ and $\theta$ in matrix IPC', $\phi$ and $\theta$ in matrix RSIPC', $\theta$ in matrix HA", $\theta$ in matrix HR", $\theta$ in matrix EA", and $\theta$ in matrix RGSEA'. At least two such full passes were performed through all the manipulable mathematical power coefficients $\phi$ and $\theta$ in the component matrices of matrix B, involving hundreds of factor analyses and negative binomial GEE analyses.

Repeated negative binomial GEE analyses of effects of about ten Factor score variable on D were conducted to optimize the calibration of the maximization of Lin's $\rho_c$ coefficient for the concordance correlation and the minimization of Pan's QIC for the correlation structure of each respective negative binomial GEE analysis. The optimal and best fitting calibration was achieved with QIC=67,816.55 and $\rho_c$=0.99050 using the specified values of manipulable coefficients $\phi$, $\theta$, $\Omega$, w, and W for the matrices that were inputted into matrices B and C and are shown in columns 3, 4, and 5 of FIG. 3. The factors in the optimal and best fitting factor analyses and GEE analyses are designated here as Factors $F_v$, where v is the integer number that identifies a specific factor.

The factor analysis that preceded the optimal and best fitting parsimonious negative binomial GEE analysis was conducted on the 621 specified columns of distance coefficients in matrix B, using the specified values of manipulable power coefficients $\phi$ or $\theta$ of the respective matrices that were inputted matrix B and are shown in column 3 of FIG. 3. Therefore, each Factor $F_v$ yielded 621 factor loadings that are designated here with $l_{vu}$, where u is the integer identifying Factor $_v$ and its respective 621 factor loadings, and v is integer identifying the respective loading. The significance of a factor loading $l_{vu}$ corresponding to Factor $F_v$ was assessed here using $\lambda=|l_{vu}|/(\mathrm{sum}|l_{vu}|)$, such that a significant factor loading $l_{vu}$ is indicated here by $\lambda>1/621$, noting that $1/621=0.00161=1.61\mathrm{E}-3$. Additionally, a significant effect of an original variable (e.g., income per capita) on infant mortality is indicated by a {(mean $\lambda$)>(1/621)} in the factor loadings that corresponded to a Factor $F_v$.

To assess effects of income per capita of all persons, IPCAP, on infant mortality, an analysis was made of the factor loadings of the 51 IPCAP variables among the 621 factor loadings of each of the ten factor loadings that correspond to Factors $F_v$ in the optimal and best fitting parsimonious negative binomial GEE model of effects on infant mortality. This inspection revealed that only factor loadings on Factor $F_6$ were significant, as indicated by mean $\lambda$=7.98E-3 for the 51 IPCAP variables corresponding to Factor $F_6$ where expected mean $\lambda$=1/621=1.61E-3. Moreover, factor loadings of the 51 IPCAP variables corresponding to Factor $F_6$ were also dominant factor loadings with 10 IPCAP variables in the top 10 highest $\lambda$ coefficients of factor loadings. The dominance of IPCAP variables in factor loadings on Factor $F_6$ was strengthened by having 52.9 percent of their corresponding 51 absolute factor loadings characterized by $\gamma$>0.5.

Figure 4:
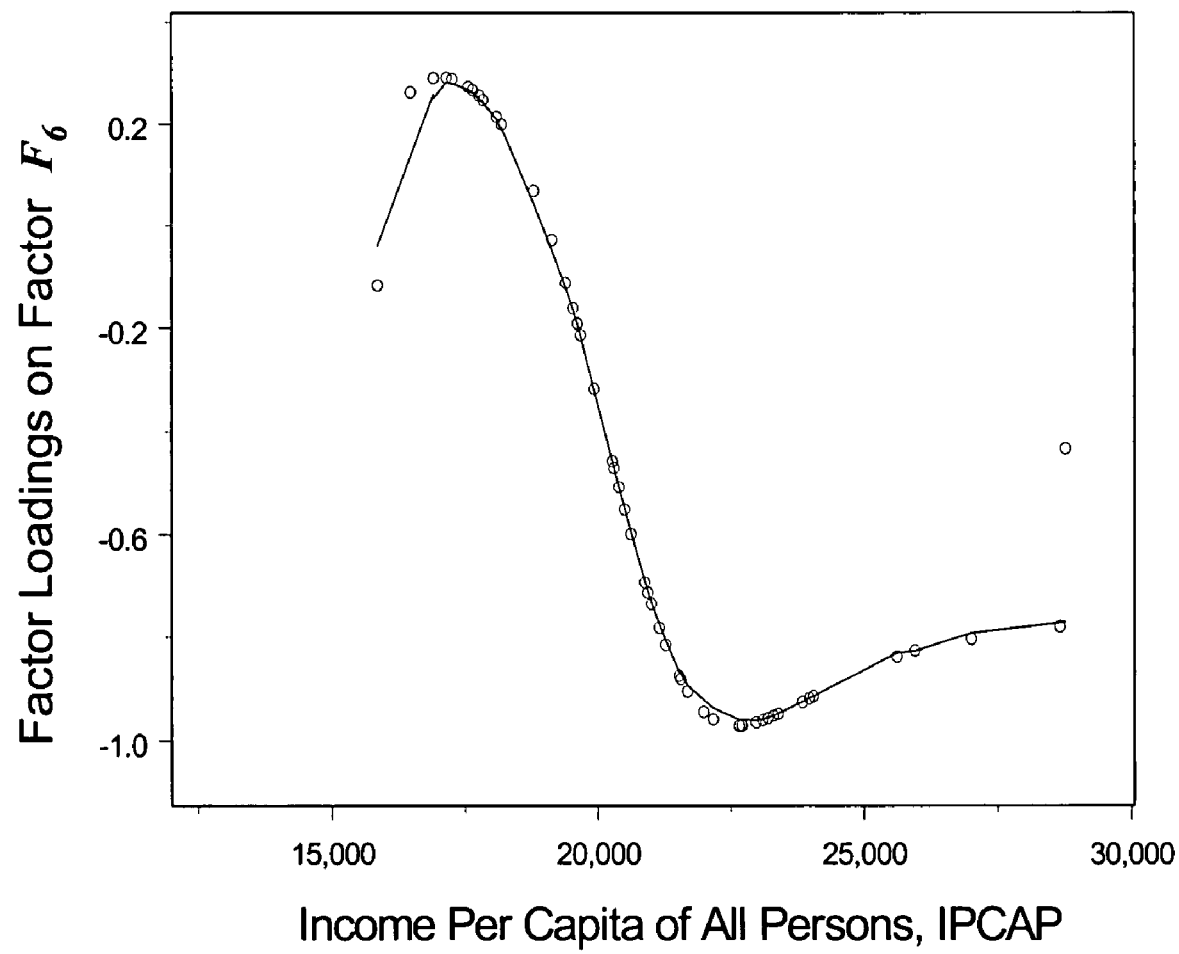
FIG. 4 presents a depiction of the structure of distribution of income per capita in U.S. states 2000. The data analysis in the embodiment of the invention shows that this structure of income per capita affected infant mortality in U.S. states 2000. This result from the data analyses in the embodiment of the invention is more valid and reliable than results of pervious research; this result is also useful for public health policy and intervention.

The structure of the distribution of income per capita of all persons in U.S. states, IPCAP, corresponding to factor loadings on Factor $F_6$ is shown in FIG. 4. The smooth line in FIG. 4 depicts the structure of distribution of IPCAP that affected infant mortality in U.S. states 2000. The 51 IPCAP values that are depicted in FIG. 4 characterize respective populations in respective 51 U.S. states. where the respective populations in 51 U.S. states can be considered as 51 real phenomena. Therefore. the 51 factor loadings on Factor $F_6$ that are shown in FIG. 4 are also 51 respective measurements of these 51 real phenomena. The newly computed analytic measurements were computed with the data analyses that are presented here.

Using the optimal and best fitting parsimonious negative binomial GEE model of effects on infant mortality and the results of analyses of significance and dominance of factor loadings for IPCAP variables, it is possible to model the effects of IPCAP on infant mortality with $$M_u = \exp(\beta'_6 F_{6u}),$$

where u refers to a gender-specific, race specific, U.S. state specific aggregate of individuals. $M_u$ refers to the infant mortality that is attributed to effects of IPCAP in real phenomenon u, $B'_6$ is the GEE coefficient corresponding to effects of Factor $F_6$ on infant mortality in the optimal and best fitting GEE model, and $F_{6u}$ are the factor scores corresponding to Factor $F_6$ and real phenomenon u in the optimal and best fitting factor analyses. Therefore, the 306 factor scores $F_{6u}$, corresponding to Factor $F_6$ are also 306 respective analytic measurements of infant mortality in 306 gender-specific, race-specific, and U.S. state specific aggregates of individuals. These newly computed analytic measurements were generated and applied with the invention that is presented here. The 306 factor scores $F_{6u}$, corresponding to Factor $F_6$, computed with optimal and best fitting factor analyses and optimal and best fitting parsimonious negative binomial GEE model, reveal the effects of the size of IPCAP and effects of structure of the distribution of IPCAP on infant mortality in U.S. states 2000. This is depicted graphically by the smooth line in FIG. 5, revealing effects of IPCAP on infant mortality 306 gender-specific, race specific, and U.S. state specific aggregates of individuals in U.S. states 2000.

The embodiment of the invention in data analyses of effects on infant mortality in U.S. states 2000 allows and accommodates correlated response data, unobserved heterogeneity, overdispersion, and correlated influential factors. The analyses provide mathematical specifications and graphic depictions of (A) multifaceted, multidimensional, nonlinear, and distinct factor analytic structures of population size, income, educational attainment, race, gender, and spatial configuration, and (B) incorporation of these structures in respective multiple orthogonal standardized constructs that affected infant mortality in U.S. states 2000. These effects reveal multifaceted, multidimensional, nonlinear, multidirectional, and distinct patterns of infant mortality.

Figure 5:
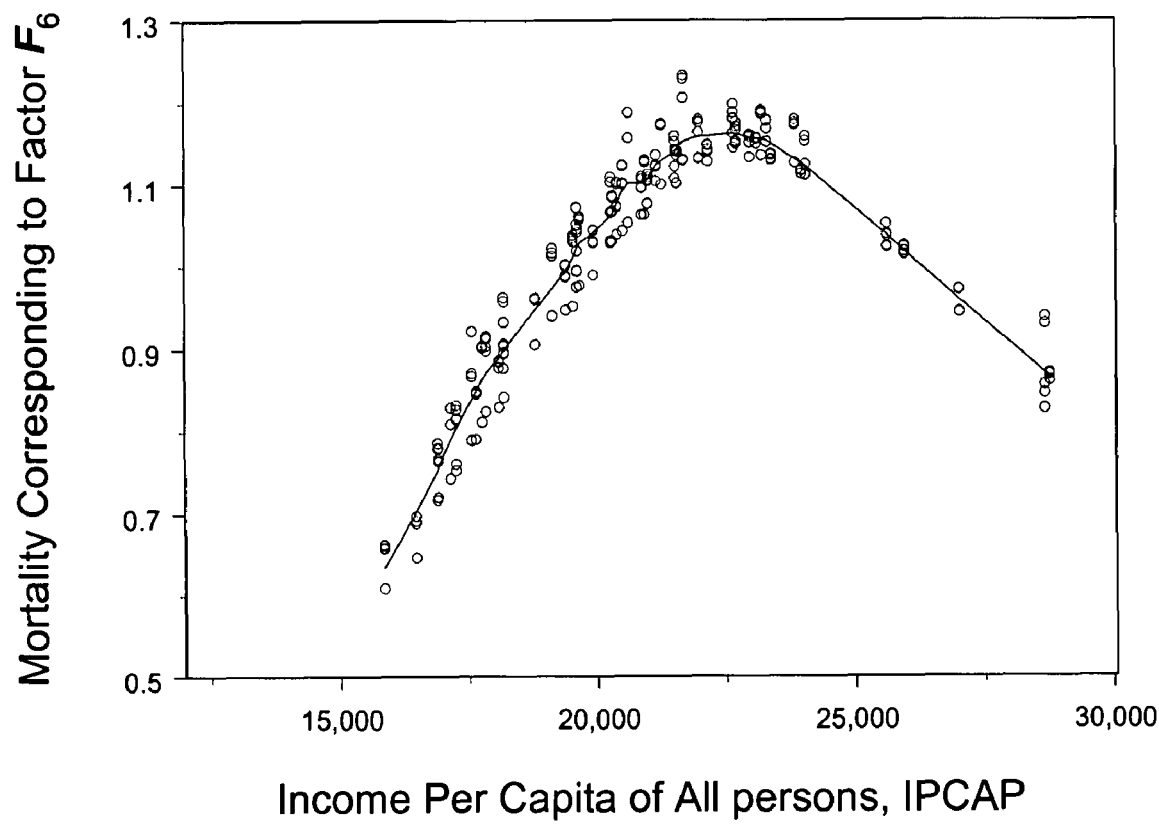
FIG. 5 presents a depiction of effects of income per capita and its distributional structure on infant mortality in U.S. states 2000. This result from the data analyses in the embodiment of the invention is more valid and reliable than results of pervious research; this result is also useful for public health policy and intervention.

The results that are presented in FIG. 4 and FIG. 5 reveal effects of size and structures of income per capita of all persons on infant mortality in 306 gender-specific, race-specific, and U.S. state specific aggregates of individuals in U.S. states 2000. These results are useful for public health policy and interventions in the United States. Similar procedures were employed to analyze effects of population size, race, gender, educational attainment, and spatial configuration on infant mortality. These analyses are now being prepared for publication in the areas of epidemiology, public health, medicine, economics, geography, sociology, and political science and are to be used by local and federal governmental agencies, policy makers, insurance companies, and others.

Finally, while the invention has been described by way of examples and in terms of the above, it is to be understood that the invention is not limited to the disclosed embodiment. On the contrary, it is intended to apply to diverse kinds of multivariate analyses and to cover various modifications that would be apparent to those skilled in the art.

CITED LITERATURE

Box, G. E. P. and D. R. Cox. 1964. "An analysis of transformations." *Journal of the Royal Statistical Society—Series B* 26:211-252.

Brillinger, David R. 1986. "The natural variability of vital rates and associated statistics." *Biometrics* 42:693-734.

Emerson, John D. 1983. "Mathematical aspects of transformation." in *Understanding Robust and Exploratory Data Analysis*, edited by D. C. Hoaglin, F. Mosteller, and J. W. Tukey. New York: Wiley.

Emerson, John D. and Michael A. Stoto. 1983. "Transforming data." Pp. 97-128 in *Understanding Robust and Exploratory Data Analysis*, edited by D. C. Hoaglin, F. Mosteller, and J. W. Tukey. New York: John Wiley.

Epelbaum, Michael. 2005. "A new theory and a new method for temporal, spatial, and other correlated phenomena." *Complexity* 11:36-44.

Everitt, B. S. 1993. *Cluster Analysis*. London: Edward Arnold.

Fourier, Jean Baptiste Joseph. 1822. *Théorie Analytique de la Chaleur*. Paris: F Didot.

Gheondea, Aurelian and Mihai Sabac. 2003. *Spectral Analysis and Its Applications: Ion Colojoara Anniversary Volume*. Bucharest: Theta.

Hardin, James W., and Joseph Hilbe. 2003. *Generalized Estimating Equations*. Boca Raton, Fla.: Chapman & Hall/CRC.

Hartigan, J. A. 1975. *Clustering Algorithms*. New York: John Wiley.

Hotelling, H. 1933. "Analysis of a complex of statistical variables into principal components." *Journal of Educational Psychology* 24:417-441, 498-520.

Heagerty, Patrick J., and Scott L. Zeger. 2000. "Marginalized multilevel models and likelihood inference." *Statistical Science* 15:1-26.

Liang, Kung-Yee, and Scott L. Zeger. 1986. "Longitudinal data analysis using generalized linear models." *Biometrika* 73:13-22.

Lin, L. I-K. 1989. "A concordance correlation coefficient to evaluate reproducibility." *Biometrics* 45:255-268.

Lin, L. I-K. 2000. "A note on the concordance correlation coefficient." *Biometrics* 56:324-325.

López-Gómez, Julián. 2001. *Spectral theory and nonlinear functional analysis*. Boca Raton, Fla.: Chapman & Hall/CRC.

Manton, G. Kenneth, and Eric Stallard. 1984a. "Heterogeneity and its effect on mortality measurement." Pp. 265-301 in *Methodologies for the collection and analysis of mortality data*, edited by Jacques Vallin, John H. Pollard, and Larry Heligman. Liege, Belgium: Ordina Editions.

Manton, G. Kenneth, and Eric Stallard. 1984b. *Recent trends in mortality analysis*. Orlando: Academic Press.

Manton, G. Kenneth, Eric Stallard, and James W. Vaupel. 1986. "Alternative models for the heterogeneity of mortality risk among the aged." *Journal of the American Statistical Association* 81:635-644.

Manton, G. Kenneth, Max A. Woodbury, and Eric Stallard. 1981. "A variance components approach to categorical data models with heterogeneous cell populations: Analysis of spatial gradients in lung cancer mortality rates in North Carolina counties." *Biometrics* 37:259-269.

Manton, G. Kenneth, Max A. Woodbury, and Eric Stallard. 1983. "A model for cancer mortality rates." *Biometrics:*531-532.

Mathworld. 2006. http://mathworld.wolfram.com/Polynomial.html. Accessed September 2006.

Meyer, Yves. 1992. *Ondelettes et Opérateurs*. Paris: Hermann.

Mullahy, John. 1997. "Heterogeneity, excess zeros, and structure of count data models." *Journal of Applied Econometrics* 12:337-350.

Pan, Wei. 2001. "Akaike's information criterion in generalized estimating equations." *Biometrics* 57:120-125.

Pearson, Karl. 1901. "One lines and planes of closest fit to systems of points in space." *Philosophical Magazine* 6:559-572.

Percival, Donald B. and Andrew T. Walden. 2000. *Wavelet Methods for Time Series Analysis*. Cambridge: Cambridge University Press.

Pinheiro, Jose C., and Douglas M. Bates. 2000. *Mixed-Effects Models in S and S-Plus*. New York: Springer.

Rencher, Alvin C. 2002. *Methods of Multivariate Analysis*. New York: J. Wiley.

Simons, Kenneth L. 2004. "globdist," http://www.rpi.edu/~simonk/stata. Accessed April 2004.

Spearman, C. 1904. "General intelligence objectively determined and measured." *American Journal of Psychology* 15:201-293.

StataCorp. 2001. *Stata 7 Reference Manual*. College Station, Tex.: Stata Corporation.

U.S. Census. 2001. "Population and Population Centroid by State: 2000." http://www.census.gov/Press-Release/www/2001/statecenters.txt. Accessed April 2004.

U.S. CDC. 2006. "CDC Wonder: Compressed Mortality File." http://wonder.cdc.gov/mortSQL.html. Accessed July 2006.

What is claimed is:

1. A method implemented by a computer having a computer program stored therein for transforming lists to matrices and optimizing results in data analyses, said computer program when executed causing the computer to perform the steps of:

specifying criterion or criteria for evaluating and comparing results of data analyses and for assessing optimality of said results;

selecting one or more lists for respective transforming of each said list of said lists to a corresponding matrix of numbers, wherein each said list includes enumerable signs that refer to real phenomena;

specifying procedure and specifying one or more mathematical equations for transforming a said list to a corresponding matrix of numbers, wherein the length of said list is denotable as n, and wherein said list is denotable as $x=(x_1, \ldots, x_n)$ where $i=1{:}n$ for n elements $x_i$, of said list, and wherein said matrix of numbers is denotable as R, and wherein said matrix has $n^2$ cells containing numbers that are denotable as $r_{jk}$ where $j=1{:}n$ and $k=1{:}n$ and where j designates the row of said matrix and where k designates the column of said matrix, and wherein each said $r_{jk}$ designates a relationship between elements $x_j$ and $x_k$ of said list x, wherein said transforming involves at least one mathematical equation with at least one manipulable mathematical coefficient, and wherein said specifying includes specifying the numerical value of every manipulable mathematical coefficient in said mathematical equation or equations;

transforming said selected list to its corresponding said matrix using said specifying in computing $n^2$ numerical values $r_{jk}$ in matrix R;

if one or more other lists of said lists are to be transformed, then independently doing said specifying and said respective transforming with each said other list;

conducting a data analysis with said matrix or matrices from foregoing transformation or transformations, and evaluating data analysis using said specified criterion or criteria;

varying in one or more of the following: said procedure or procedures, said mathematical equation or equations, said specifying of said numerical value or values of said manipulable mathematical coefficient or coefficients, or method or methods of said data analysis;

retransforming using said transforming and said varying;

reanalyzing data following said retransforming, and evaluating results of said reanalyzing using said specified criterion or criteria;

revarying using anew said varying, and retransforming using anew said retransforming, and reanalyzing using anew said reanalyzing, and evaluating and comparing results of foregoing data analyses using said specified criterion or criteria;

reiterating using anew said revarying, said retransforming, and said reanalyzing, and evaluating, comparing, and assessing optimality of results of foregoing data analyses using said specified criterion or criteria;

reiterating using anew said reiterating until selection of a final said specified procedure for said transforming of each said list, and until selection of final said method of data analyses, and until selection of final said specified mathematical equation or equations for said transforming of each said list, and until evaluating, comparing and assessing optimality of results of data analyses with at least three mathematical values for each said manipulable mathematical coefficient of each said selected final mathematical equation or equations with said selected final procedure and said selected final method;

optionally reiterating using anew said reiterating of said reiterating, and evaluating, comparing and assessing optimality of results of said optional data analyses with more than three mathematical values for each said manipulable mathematical coefficient of each said selected final mathematical equation or equations with said selected final procedure and said selected final method, and optionally continuing said optional reiterating;

following conclusion of said reiterating of said reiterating, and upon conclusion of all said optional reiterating if any, selecting said data analysis that renders result or results that most closely meet said criterion or criteria of optimality; and using result or results of said selected data analysis that renders result or results that most closely meet said criterion or criteria of optimality.

2. The method of claim 1, further including additional data in said data analyzing or said data reanalyzing.

3. The method of claim 1, further including additional methods of data analysis in said data analyzing or said data reanalyzing.

4. The method of claim 2, further including additional methods of data analysis in said data analyzing or said data reanalyzing.

* * * * *